United States Patent [19]
Schlafer et al.

[11] Patent Number: 5,725,759
[45] Date of Patent: Mar. 10, 1998

[54] REACTOR APPARATUS FOR TREATING WATER IN IRON REMOVAL SYSTEM

[75] Inventors: John L. Schlafer, Woodberry, Minn.; Lori Nyland, Burlington, Vt.; William Raatz, Wyoming, Minn.

[73] Assignee: Ecowater Systems, Inc., Woodbury, Minn.

[21] Appl. No.: 625,659

[22] Filed: Mar. 29, 1996

[51] Int. Cl.$^6$ .................................................. C02F 1/72
[52] U.S. Cl. .......................... 210/120; 210/151; 210/205; 210/218; 210/188
[58] Field of Search ............................ 210/120, 150, 210/151, 202, 205, 218, 718, 722, 806, 188

[56] References Cited

U.S. PATENT DOCUMENTS

| | | | |
|---|---|---|---|
| 3,649,532 | 3/1972 | McLean | 210/48 |
| 3,649,533 | 3/1972 | Reijonen et al. | 210/50 |
| 3,943,955 | 3/1976 | Bradley | 137/14 |
| 4,028,244 | 6/1977 | Holmberg | 210/150 |
| 4,108,763 | 8/1978 | Clough | 210/14 |
| 4,129,502 | 12/1978 | Garrett et al. | 210/60 |
| 4,274,970 | 6/1981 | Beitzel | 210/748 |
| 4,320,001 | 3/1982 | Le Boeuf | 210/120 |
| 4,430,228 | 2/1984 | Paterson | 210/665 |
| 4,451,361 | 5/1984 | Paterson | 210/136 |
| 4,515,692 | 5/1985 | Chandler et al. | 210/278 |
| 4,534,867 | 8/1985 | Kreusch et al. | 210/722 |
| 4,565,634 | 1/1986 | Lydersen | 210/718 |
| 4,659,463 | 4/1987 | Chandler et al. | 210/202 |
| 4,695,378 | 9/1987 | Ackman et al. | 210/198.1 |
| 4,749,493 | 6/1988 | Hicks | 210/617 |
| 4,956,080 | 9/1990 | Josefik | 210/205 |
| 4,966,692 | 10/1990 | Overy | 210/205 |
| 5,013,453 | 5/1991 | Walker | 210/712 |
| 5,061,377 | 10/1991 | Lee et al. | 210/752 |
| 5,075,016 | 12/1991 | Barnes | 210/760 |
| 5,080,805 | 1/1992 | Houser | 210/722 |
| 5,096,580 | 3/1992 | Auchincloss | 210/202 |
| 5,096,596 | 3/1992 | Hellenbrand et al. | 210/721 |
| 5,147,530 | 9/1992 | Chandler et al. | 210/90 |
| 5,250,193 | 10/1993 | Sawicki et al. | 210/761 |
| 5,324,439 | 6/1994 | Chen et al. | 210/761 |
| 5,358,643 | 10/1994 | McClintock | 210/722 |
| 5,494,583 | 2/1996 | Dieter | 210/721 |
| 5,494,589 | 2/1996 | Moorehead et al. | 210/205 |

FOREIGN PATENT DOCUMENTS

| | | |
|---|---|---|
| 2408051 | 8/1975 | Germany . |
| 1161480 | 6/1985 | U.S.S.R. . |

*Primary Examiner*—Peter A. Hruskoci
*Assistant Examiner*—Betsey J. Morrison
*Attorney, Agent, or Firm*—Rudnick & Wolfe

[57] ABSTRACT

A system for removing iron from well water which, in addition to sources of air and water and an iron filter, has a reaction chamber wherein water containing dissolved iron is turbulently mixed with air and after oxidation of the water, excess air is removed through venting means located approximately midway between the ends of the reaction chamber.

11 Claims, 1 Drawing Sheet

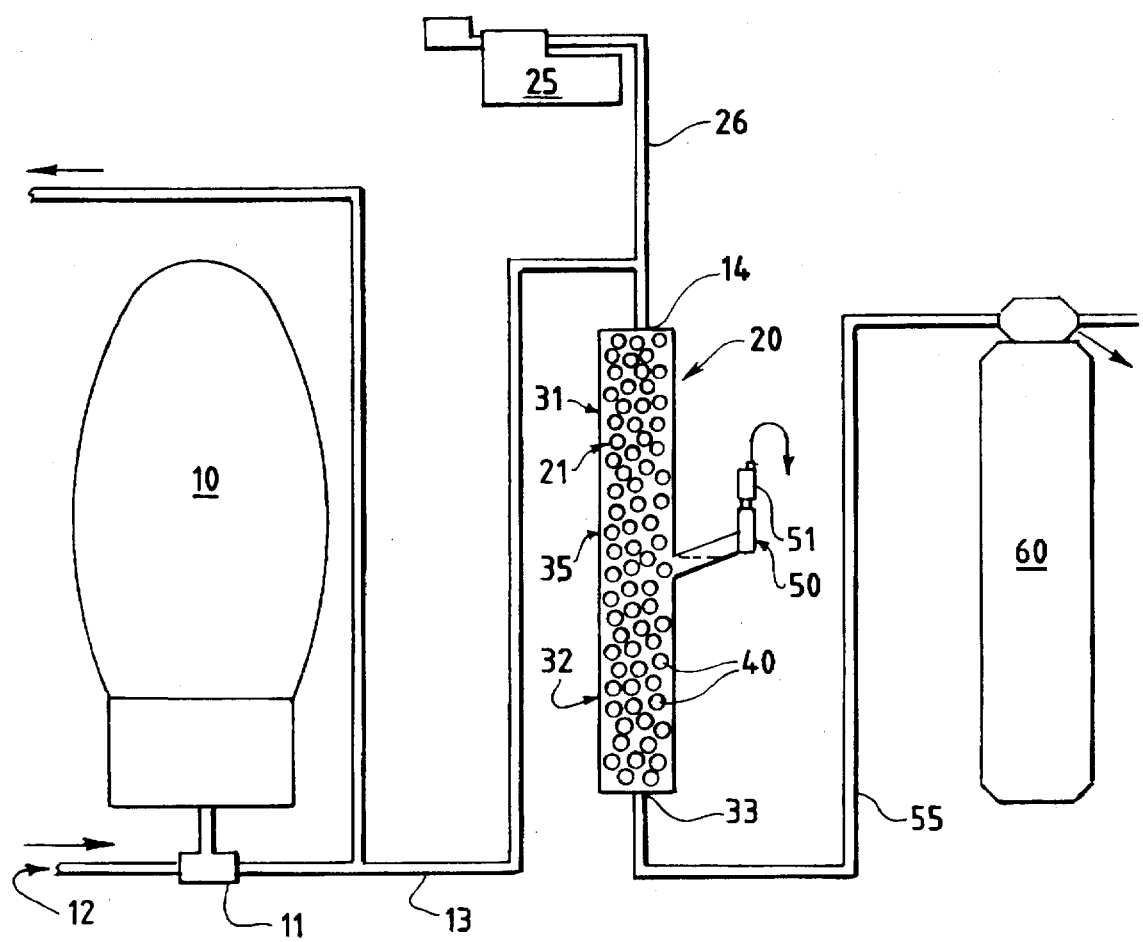

REACTOR APPARATUS FOR TREATING WATER IN IRON REMOVAL SYSTEM

TECHNICAL FIELD

The present invention relates to a system for removing certain contaminants or impurities from well water by oxidation effected by the injection of air into a reaction chamber having first and second sections wherein the air is first mixed intimately with incoming water through the use of baffles that break up the fluid flow paths and where thereafter in, the second section of the reaction chamber, the baffles act to strip the previously aerated water of excess air and permit it to be vented, so that it does not enter the water distribution system.

BACKGROUND ART

It is well known that water drawn from wells usually contains a variety of impurities or contaminates. The most usual contaminates occurring naturally in well water are iron, sulfur and manganese, although many man-made contaminates are now also found. These mineral contaminates may cause stained plumbing fixtures and corroded pipes and in addition, may result in the presence of disagreeable odors and improper taste to the water.

Undesirable mineral content is removed from raw water by a variety of methods, although most of the methods involve treatment of the water with oxidizing substances. For example, removal of iron and manganese is commonly effected by running the water through a filter with a bed of minerals periodically regenerated with a chemical such as potassium permanganate to oxidize the dissolved metals forming either oxides or hydrates which are precipitated and removed in the filter. Another method that is widely used is that of injecting a quantity of oxygen, either as pure oxygen or more commonly in the form of air. Possibly the most widely accepted method for introducing air into well water is by means of air aspiration produced through use of a venturi orifice. Of a somewhat more limited use has been the direct injection of air under pressure into a body of water to provide the oxygen necessary to oxidize the metal ions for ultimate removal from the water.

A system illustrating the use of air aspiration to precipitate iron is shown in U.S. Pat. No. 5,096,580. In this arrangement, well water is drawn by means of a pump through a pipe and into a pressure tank. From that point, the water ultimately is directed, upon a demand basis to an oxygen induction device, which is in fact a venturi jet, that aspirates air into the water at that point. The induction of air created by the venturi orifice is located close to the filter tank so that build up of precipitated iron oxide or iron hydrates is prevented from occurring in the pipe.

In U.S. Pat. No. 3,649,532, water enters through an inlet and is passed through a venturi type air aspirator unit where it then continues to flow through a valve and to an inlet tube which is located on the interior of a filter tank. An automatic air release is provided in the upper portion of the tank to vent air and sulfur containing gases to the exterior. One problem encountered with this type of system results from the fact that the incoming air/water mixture are present together for a comparatively short time before being released into the interior of the tank and oxidation of the dissolved metal content is often inadequate to effect good cleansing of the well water.

A different sort of system is shown in U.S. Pat. No. 4,749,493. In this instance, an oxygen supply is introduced into the bottom of a column which contains a plurality of rings. The interior of the column is first filled with an oxygen supply and then water flows upwardly through a tube, exiting through a screen. The water then percolates downwardly through the rings acquiring oxygen from the oxygen enriched environment that had been initially placed in the column from the oxygen supply. In this apparatus, the oxygenated water is withdrawn through the discharge ports located in the bottom portion of the column. U.S. Pat. No. 4,695,378 shows an apparatus used for the purpose of treating acid mine water and involves the use of a pair of jet pumps using a venturi effect to provide aeration of the water. Following introduction of water through aspiration, the flow is then into a static mixer which has a helical interior that swirls the water and air to provide some additional mixing of the air and water. This aspiration describes a process for introducing air into acid mine water and performing a mechanical mixing operation but does not deal with the ultimate use of water for consumer use. Other patents which may be referred to are U.S. Pat. Nos. 3,649,533, 4,534,867, 4,659,463, 5,061,377, 5,096,596 and 5,147,530.

Technical Problem To Be Solved

While the processes that constitute the prior art recognize the use of air or oxygen introduction into water, for certain purifications, problems still exist. For example with systems utilizing venturi aspiration of air into water, the venturi devices are both difficult to maintain and to obtain the introduction of sufficient quantities of air into the water to effect complete oxidation of dissolved mineral elements. The venturi is a flow restrictor which limits water pressure to the end user or adds a load on the well pump. When oxidation does occur, depending upon the location where the air is aspirated, precipitation of mineral elements from solution can occur which can result in blockage and constriction of conveying pipes. No effective system is known in which sufficient oxidation is obtained by merely tumbling air and water together. In systems using air injection, unremoved excess air creates blockages and noises in plumbing systems.

The apparatus of the present invention provides an efficient, economical apparatus and system for dissolving substantial quantities of air (oxygen) into well water and also for removing excess oxygen that might otherwise result in transport difficulties. In addition, the present system insures that there is maximum physical interaction between the oxygen bearing air and the water so that thorough aeration of the water is accomplished to oxidize the maximum amount of dissolved mineral content. The apparatus further provides for continued agitation of the air/water mixture to result in the removal of excess air and to thereafter enable its venting to the exterior of the aerating reactor apparatus. Specifically, by providing a vent in an air/water reactor chamber at such a location that excess amounts of air can be present in a first section of the chamber while exhausting the excess air from a second section of the chamber.

DESCRIPTION OF THE DRAWING

The drawing shows a schematic layout of a mineral reduction system utilizing the iron reactor apparatus of this invention.

DESCRIPTION OF THE INVENTION

Generally, air injection into well water containing dissolved iron manganese and hydrogen sulfide is a method suitable for treating these contaminates if certain criteria is met. Specifically, the system should be maintained at a pH above 6.8, the air and water must be adequately mixed for a sufficient amount of time to oxidize the mineral content and the water containing the precipitants must then be filtered through a medium, such as BIRM™ to remove the particulate material.

DETAILED DESCRIPTION OF THE PREFERRED EMBODIMENT

Generally, the principle components of the present system include a pressure tank 10 which is connected through pressure switch 11 to a source 12, such as a well pump. The pressure tank is used to accumulate water taken from the well and stored until it is needed for use. Pressure tank 10 is connected, as by means of pipe 13, to an inlet 14 located in the top of a vessel 20 which defines a reaction chamber 21. Also connected to inlet 14 is a source of pressurized air 25 which provides the air for introduction into the reaction chamber 21, through pipe 26.

It can be seen by referring to the drawing that the reaction chamber 21 is made up a substantially vertically disposed elongated body having an upper end 31 and a lower end 32, the lower end 32 having an outlet 33. The preselected length of the intermediate portion 35 of reaction chamber 21 is located about midway between the upper and lower ends 31, 32 of reaction chamber 21.

Contained within the reaction chamber 21 are fluid flow baffles 40 which are distributed as unsupported individual bodies substantially throughout the entire volume of the reaction chamber. These baffles conveniently take the form of perforated or hollow balls or spheres which are about one inch in diameter and may be constructed of a plastic such as polyethylene and polypropylene. The baffle elements are present to insure that two individual reactions take place within the reaction chamber. First, when the water is introduced into the upper section 31 of reaction chamber 21, it must flow over the surfaces of the baffle elements 40; thereby the water is exposed to the maximum effect of the air already present in the reaction chamber. As the water flows downwardly through the chamber 21 and into the lower section 32, the baffles then continue to turbulently mix air and water, but simultaneously separate the air from the water, the separated air migrating upwardly toward the air vent 50. Air vent 50 contains a valve 51 which permits release of the separated excess air from the second region within the reaction chamber 21. Valve 51 may be a one way valve that is normally open but which closes to preclude flow of water therethrough. The water then passes out of the reaction chamber through outlet 33 and, via pipe 55, goes into the iron filter 60. The iron filter 60 may contain a substance such as BIRM™ to further oxidize any remaining solute mineral as well as to filter out those that have precipitated from solution.

The iron reactor is intended to be used in a residential household with a well-pump system. The iron reactor operates in conjunction with the well pump system which provides pressure to the household plumbing. A typical well pump cycle begins when the well pump turns on at the lower pressure limit and stays on until enough water has been introduced to pressurize tank 10 for the upper pressure limit to be reached and the pump then turns off. The air pump 25 of the iron reactor system is wired directly to the same pressure sensitive switch 11 used by the well pump. When the well pump turns on, the air pump 25 also turns on. The air pump at this time delivering air to the reaction chamber 31 while water is being delivered to pressure tank 10. After well pump turns off, the air pump 25 also turns off but the reaction chamber is now charged with a fresh quantity of oxygen rich air. Subsequently as water is called for, it enters the upper section 31 of the iron reactor where the aeration baffles 32 first mix the air and water together and then it goes into lower section 32 for separation of the excess air from the water.

What is claimed is:

1. An oxygen/water reactor apparatus for use in a system for removing dissolved iron from water, which system includes separate sources of air and water and a filter for removing iron oxide from water, the reactor apparatus comprising:

A. a vessel defining a reaction chamber comprising first and second sections, the vessel having (1) an inlet connectable to a source of air and to a source of water and (2) an outlet connectable to the iron filter for removing iron oxide from water;

B. first baffle means disposed in the first section of the reaction chamber for dissolving oxygen in the water to oxidize dissolved iron in the water;

C. second baffle means disposed in the second section of the reaction chamber for removing excess gases from the water, whereby water suitable for residential use is provided, wherein said first and second baffle means comprise unsupported individual bodies; and D. air vent means operably connected to the second section of the reaction chamber to vent excess air from the second section of the reaction chamber.

2. An oxygen/water reactor apparatus as defined in claim 1 wherein the first and second baffle means comprise spheres that substantially fill the reaction chamber.

3. An oxygen/water reactor is defined in claim 2 wherein each of the spheres is perforated and has a diameter of about one inch.

4. An oxygen/water reactor apparatus as defined in claim 2 wherein the spheres are constructed of a plastic selected from the group consisting of polyethylene and polypropylene.

5. An oxygen/water reactor apparatus as defined in claim 1 wherein the vessel defining the reaction chamber is comprised of (a) a substantially vertically disposed elongated body having upper and lower ends containing the inlet and outlet, respectively; and (b) the air vent is located between the upper and lower ends.

6. An oxygen/water reactor apparatus as defined in claim 5 wherein the vent is located approximately midway between the upper and lower ends of the elongated body.

7. An oxygen/water apparatus as defined in claim 1 wherein the air vent means include a one way valve that is normally open but which closes to preclude flow of water therethrough.

8. In a system for removing dissolved iron from water, which system includes separate sources of pressurized water and air and a filter for removing iron oxide from the water, the combination of an oxygen/water reactor apparatus comprising:

A. a vessel defining a reaction chamber comprising first and second sections, the vessel having (1) an inlet operably connected to a source of pressurized air; and (2) an outlet operably connected to the iron filter for removing iron oxide from the water;

B. first baffle means disposed in the first section of the reaction chamber for dissolving oxygen in the water to oxidize dissolved iron in the water;

C. second baffle means disposed in the second section of the reaction chamber for removing excess gases from the water, whereby water suitable for residential use is provided, wherein said first and second baffle means comprise unsupported individual bodies; and D. an air vent means connected to the reaction chamber to remove excess air from the second section of the reaction chamber.

9. A system as defined in claim 8 wherein the first and second baffle means are individual spheres which substantially fill the chamber.

10. A system as defined in claim 8 wherein the reaction chamber is comprised of (a) a substantially vertically disposed elongated body having upper and lower ends containing the inlet and outlet respectively and (b) the air vent means is located approximately midway between the upper and lower ends.

11. A system of removing iron from water comprising:

A. separate sources of pressurized air and pressurized water;

B. an iron filter for removing oxidized iron from the water;

C. an iron oxygen reactor apparatus, having first and second sections, operably connected to the sources of water and air and to the iron filter;

D. first baffle means disposed in the first section of the reactor apparatus for dissolving oxygen in the water to oxidize dissolved iron in the water;

E. second baffle means disposed in the second section of the reactor apparatus for removing excess gases from the water, whereby water suitable for residential use is provided, wherein said first and second baffle means comprise unsupported individual bodies; and F. a vent operably connected to the second section of the reactor apparatus to remove excess air from the reaction chamber.

* * * * *